3,360,356
METHOD OF CONTROLLING UNDESIRABLE PLANT GROWTH
Joseph F. Vartiak, Naperville, Ill., assignor to Nalco Chemical Company, Chicago, Ill., a corporation of Delaware
No Drawing. Filed May 27, 1964, Ser. No. 370,691
3 Claims. (Cl. 71—65)

The instant invention relates to an improved method of inhibiting growth and reproduction of noxious vegetation. More specifically, the present invention relates to an improved method of destroying undesirable vegetation by spray techniques.

The use of herbicides to control and inhibit undesirable weed growth is well-known and of widespread usage in the agricultural, industrial, and domestic fields. Roadsides, embankments, railway right-of-ways, and other earth surfaces are often subjected to treatment with toxic chemicals, organic and inorganic. Numerous compounds with widely variant functionalities are effective to a greater or lesser degree in inhibiting or destroying the growth of undesirable vegetation.

Noxious plants or weeds which interfere with human operations broadly include broad leaf plants and grasses. Herbicides have been tailored to destroy or inhibit the growth of both of these or a single group. In some instances, mixtures of herbicidally active components are employed to combat various species of pervasive type plants.

One of the most widely used techniques in eradicating undesirable weed growth is accomplished by spraying the herbicidally active chemical upon the area within which the plants are growing. In some instances, pre-emergence spraying is carried out. That is, suspected areas of weed growth are sprayed in early spring or late fall to prevent even an appearance of noxious plants or at the least to severely weaken their growth patterns. One of the most effective ways of carrying out a weed control program is spraying the area under control from moving vehicles. As just one example, it is a common practice to spray railway right-of-ways from a moving train.

Certain problems arise in connection with a herbicidal spray program. First, and foremost, is the problem of misting or fogging which generally begins to occur at a spray pressure of 15 p.s.i. and worsens as spray pressures are increased. The herbicidal spray tends to drift and many valuable crops can be destroyed or damaged to varying degrees. In some instances, due to extreme toxicity of certain herbicides, even valuable animal life such as livestock can be injured. The problem of drift has become more widespread in recent years, due to both the more extensive use of herbicides, as well as application of these herbicides as concentrated solutions in low volumes per acre.

Generally, undesirable drift from spraying of herbicidal solutions may occur in two ways. First, spray drift may occur as a result of the smaller droplets in the spray being carried away from the target by wind or convection currents. Second, the vapor from a volatile herbicide may be carried away from the target area during or after the spraying in a type of phenomenon called vapor drift. This is most likely to occur in hot weather and can take place even in the absence of wind.

Efforts to substantially reduce spray and vapor drift have in the past generally been unsuccessful or impractical. To minimize drift, spraying may be carried out only on days when there is negligible air movement. Such practice is impractical and substantially inhibits overall efficiency of a herbicidal control program. Likewise, efforts to reduce undesirable misting or fogging by specific design of nozzles has met with only limited success, and even in such cases requires an impractical sophisticated mechanical design. Lowering the spray pressure does aid to some degree in preventing drift. However, sound economics of a herbicidal spraying operation consistent with good weed control do not allow too great a reduction in spray pressures.

It would therefore be a considerable advance in the herbicidal art if a new and novel method of spraying herbicidally active chemicals was devised, whereby undesirable drift was substantially reduced or even done away with entirely as a problem. If a stream of herbicide chemical could be sprayed from solution form, on exact target without substantial misting or fogging simultaneously taking place, considerable benefits would accrue. Particularly, desirable animal and plant life could be preserved without any decrease in efficiency of eradicating noxious vegetation. Moreover, if such method could be carried out without sacrificing operational speed of present herbicidal spray methods, widespread use of such an improved process would be feasible. Specifically, if spray techniques could be carried out at relatively high pressures without fear of misting or fogging, it would be a valuable tool to the overall field of herbicide control. Lastly, if the problem of misting or fogging were done away with in spraying herbicides dissolved or dispersed in a variety of liquid carriers such as water, oils, etc., such versatile process would become widely adapted in any conventional herbicide spray program.

It therefore becomes an object of the invention to provide an improved method of spraying liquids whereby misting or fogging tendencies of these liquids are substantially reduced.

Another object of the invention is to provide an improved method of inhibiting the growth and reproduction of noxious plants by spraying herbicidal liquids within the area to be controlled.

A specific object of the invention is to provide an improved method of spraying herbicidal liquid concentrates which may be adapted for use in spraying herbicides carried in both hydrophobic and hydrophilic type solvents.

Other objects will appear hereinafter.

In accordance with the invention an improved method of controlling the growth of undesirable vegetation has been discussed. In its broadest aspect this invention is involved with modification of the conventional process of spraying with a solution containing a herbicidal component. The improvement of this process which constitutes the gist of the invention comprises spraying a herbicidal solution in presence of a polymer which is soluble in the herbicidally active solution in at least use dosages. Under such conditions the misting tendencies of the herbicide liquid when sprayed are substantially reduced. Spray or vapor drift which normally occurs during a high pressure spray operation is substantially reduced, and in some instances completely obviated.

An important concept of the invention is to carry out the primary object of reducing misting or fogging of spray solutions by appropriate incorporation of polymer reagent, but without substantially increasing the viscosity of the solution after polymer dissolution. It has been discovered that this can be accomplished in the practices of the instant invention, since only relatively minute amounts of polymer need be present to accomplish the object of mist or fog control. If the viscosity of the polymer-treated herbicidal liquid is markedly increased several drawbacks are inherently present. First, undesirable plugging of herbicidal solution in spray nozzles may occur. Also, substantial viscosity increases of a treated herbicidal liquid would cause severe pumping problems.

Another deficiency in use of viscous herbicidal concentrates would be a marked decrease in volume of spray solution per unit of time which can be efficiently sprayed upon the situs to be controlled. Other drawbacks in application of a viscous solution via spray techniques will be apparent to those skilled in the art. It is thus a primary achievement in the invention to be able to carry out the anti-misting or anti-fogging control with relatively no increase in solution viscosity of herbicide solutions.

The process of the invention may be carried out via a wide variety of different techniques. For example, the polymer may be inter-dispersed with the spray from a separate polymer source during the actual spraying operation itself. Likewise, the polymer treating agent may be combined with the herbicidal liquid at the initial point of spraying by introducing the polymer into the spray nozzle or even the nozzle orifice from some outside reservoir. The most practical method of incorporation of polymer into herbicidal solution involves a treatment of the solution prior to the actual spray step. The polymer is preferably dissolved in the herbicidal solution and homogeneously dispersed throughout by conventional mixing techniques. This may be accomplished at any time prior to spray breakdown of the herbicidal solution phase into actual spray droplets. One convenient method is to dissolve the polymer into the herbicidal solution just immediately before application. For example, the actual mixing operation may be effected upon a moving vehicle such as a railroad car which is used to spray the particular area to be controlled. It is understood, of course, that the herbicidal process of the invention may be carried out by either spraying undesirable vegetation while in growth stage or spraying the ground prior to plant emergence.

Depending upon the nature of the polymer, its molecular configuration, molecular weight, etc., use dosages may be varied over a considerable range. It is preferred that the viscosity of an aqueous herbicidal concentrate not be increased more than 20 centipoises after addition of polymer. The dosages of polymer can be therefore adjusted within these limits. Excessive dosages of high molecular weight polymer have the tendency in most instances to increase the viscosity beyond the above stated range, and should be avoided. In the case of a primarily hydrophobic or oil-based solution, the viscosity should not be increased more than 100 centipoises. With the above points in mind, generally in the most preferred practice of the invention from about 10 to about 1000 p.p.m. of high molecular weight polymer are added to the herbicidal liquid. Within this range, misting or fogging vegetation may be done away with by following the thus described invention.

The anti-misting polymer may be added to any type of solution containing a wide variety of herbicidally active chemicals. These chemicals are generally applied in solution form in one of the following liquid forms: water, oil, oil-in-water emulsions, and water-in-oil emulsion. By the term "aqueous solution" is meant a solution containing a predominant portion of water in addition to a herbicidal component as well as an oil-in-water emulsion. In most instances the water component comprises at least 50% by weight of the solution, and more often at least 60%. In case an aqueous herbicidal solution is to be treated as defined above, it is greatly preferred that a water-soluble linear polymer be added as the anti-misting reagent.

Likewise, by the term "oil solution" is meant a herbicidal liquid containing a hydrocarbon constituent as the primary component, and again includes water-in-oil emulsions. Such oil solutions normally contain at least 50% by weight of oil and more often 60% by weight. If such a system is to be treated with an anti-fogging polymer, it is again greatly preferred that the polymer be soluble in the oil or hydrocarbon phase to achieve best results. As in the case of an aqueous solution, the oil-based herbicidal liquid may contain minor amounts of other solvents or additives such as organic solvents, for example, alcohols, ketones, esters, etc. Emulsifying agents, surface-active chemicals, dispersing aids, etc., may also form a portion of the herbicidal solution. For example, detergent-type wetting agents may be employed, as for example, those described in the article entitled "Detergents and Emulsifiers" by John W. McCutcheon, 1963.

Oil-containing herbicidal solutions as straight oil solutions, oil-in-water emulsions, and water-in-oil emulsions, may be made of a variety of hydrocarbons or petroleum products such as kerosene, mineral oil, naphthas, gas oils, crude oil, light distillates, etc. In many instances the hydrocarbon oil carrier for the herbicide is itself phytotoxic in nature. In particular, it has been found that those hydrocarbons that are best for providing oil-based herbicidal concentrates, which may be subsequently treated with anti-misting polymer, are hydrocarbon oils which may be generically classified as "aromatic petroleum hydrocarbon solvents." Specifically, this type of solvent includes those particular petroleum type solvents which contain at least 5% by weight of aromatic components and most preferably, 50% by weight or more. Examples of solvents of this type are listed in Table I below. For convenience, the specifications of these typical industrial aromatic type oils are included.

TABLE I

| Specifications | Compositions | | | | | | | |
|---|---|---|---|---|---|---|---|---|
| | A | B | C | D | E | F | G | H |
| Specific Gravity at 60° F | 0.899 | 0.895 | 0.899 | 0.931 | 0.947 | 0.987 | 0.934 | 0.927. |
| Flash Point PMCC (° F.) | 215 | 280 | 215 | 210 | 250 | 220 | 200 | |
| Aromatics and Olefins (percent) | 45–48 | 11.7 | 53 | 83 | 70 | | 64 | 85. |
| Color ASTM | 1.5 | | | 5.0 | Green | | | Pale Amber. |
| Aniline Point | 117° F | 60.8° C | | Mixed 26° F | 88° F | Mixed 66° F | | 78° F. |
| Pour Point | −5° F | −30 | | | | | | |
| Sulfur (percent) | 0.8 | | 1.6 | 0.7 | | | | |
| Viscosity S.U. at 100° F. ASTM Distillation | 36 | 58 | | | 42 | 36 | 36 | |
| I.B.P. ° F | 430 | 518 | 440 | 430 | 488 | 454 | 460 | 340. |
| 10% Recovered | 485 | 564 | 500–520 | 445 | | 478 | 470 | 363. |
| 50% Recovered | 525 | 614 | 530–560 | 463 | | 510 | 510 | 446. |
| 90% Recovered | 587 | 680 | 585–610 | 497 | | 600 | | 500. |
| End Point | 620 | 725 | 640 | 540 | 748 | 650 | 730 | 532. |
| Pentachlorophenol solution at 40° F. (percent) | 12.5 | 10.0 | 12.5–15.0 | 15.0 | 12.5 | 15.0 | 15.0 | | is at the very minimum substantially reduced. In some instances such undesirable phenomenon has been completely corrected. The target of the herbicidal solution thus reaps the exclusive benefit of herbicidal control without undesirable side effects of injury to crops and desirable plant species. Likewise, fear of injury to animals who may feed upon herbicidally contacted non-target vegetation may be done away with by following the thus described invention.

The most effective oil-based herbicidal liquids which may be treated in the instant invention contain oils which have an aromatic content of at least 50% and more preferably from 70 to 85% by weight.

The invention is adaptable to spraying a vast number of known herbicides which are soluble, dispersible, or emulsifiable in aqueous or hydrocarbon solvents or mixtures or emulsions thereof. Specific herbicidal liquid concentrates which may be sprayed in the presence of high molecular weight polymer include the following representative classes; such substituted uracils as 5-bromo-3-sec butyl-methyl uracil, such aryl alkyl urea herbicides as 1-phenyl-3-methylurea, 1-(3 chloro-4-methoxyphenyl)-3,3-dimethylurea, 1-(3-chlorophenyl)-3,3-dimethylurea, 1-(3, 4 dichlorophenyl)-3,3-dimethylurea, and 1-phenyl-3,3-dimethylurea; acidic herbicides such as 2,4-dichlorophenoxyacetic acid, 2-methyl-4-chlorophenoxyacetic acid, 2,4,5-trichlorophenoxyacetic acid, 3,4-dichlorophenoxyacetic acid, 4-chlorophenoxyacetic acid, 2-(2,4-dichlorophenoxy)propionic acid, 2-(2-methyl-4-chlorophenoxy) propionic acid, 2-(2,4,5-trichlorophenoxy) propionic acid, 2-(3,4-dichlorophenoxy) propionic acid, 2-(4-chlorophenoxy) propionic acid, 4-(2,4-dichlorophenoxy) butyric acid, 4-(2-methyl-4-chlorophenoxy)butyric acid, 4-(2,4,5-trichlorophenoxy) butyric acid, 4-(3,4-dichlorophenoxy) butyric acid, 4-(4-chlorophenoxy) butyric acid, trichloroacetic acid, 2,2-dichloropropionic acid, 2,2,3-trichloropropionic acid, 2,3,6-trichlorobenzoic acid, 2,3,5,6-tetrachlorobenzoic acid, N-1-naphthylphthalamic acid, 2,6-endoxohexahydrophthallic acid, isopropyl xanthic acid, monomethylarsonic acid, polychlorobenzoic acid, such substituted picolinic acids as 4-amino 3,5,6-trichloro picolinic acid and pentachloropentadienoic acid; salts, esters, amides of any of the foregoing herbicidal acids or others; maleic hydrazide and its herbicidal derivatives; polychlorophenols (3 to 5 chlorine atoms) and their alkaline salts; sulfamic acid and its salts; alkaline salts of cyanic acid; alkaline salts of thiocyanic acid; alkaline salts of arsenous and arsenic acids; sodium borates; sodium or calcium cyanamide; phenyl mercury salts (acetate, oleate, formate, lactate, chloride, phosphate, and the like); isopropyl esters of phenyl- and chlorophenylcarbamic acids; 1,2,4-trichlorobenzene; dinitrophenols (dinitro-o-cresol and dinitro-o-butylphenol) and their salts; boron trifluoride amine complexes; amino substituted s-triazines such as 2-chloro-4,6-bis (ethylamino)-s-triazine, 2-chloro-4, ethylamino-6, isopropylamino-s-triazine, 2-methoxy-4, 6-bis(isopropylamino)-s-triazine, 2-chloro-4,6-bis(diethylamino)-s-triazine, etc., and various combinations of the just mentioned herbicides and others.

As mentioned above, the mist-decreasing polymers of the invention should have a molecular weight in excess of 100,000. Greatly preferred polymeric additives have a molecular weight of at least 300,000. In many instances the molecular weight of the polymer additives ranges as high as 1–10 million or more.

If the herbicidal liquid to be treated is aqueous in nature or an oil-in-water emulsion, the preferred polymeric structures are derived by the polymerization of at least one mono-olefinic compound through an aliphatic unsaturated group to yield a water-dispersible synthetic polymer having a structure substantially free of crosslinkage. The polymer is therefore available for solubilization or sufficient dispersion in the particular aqueous liquid to be treated. Treating agents found to be especially effective for the purpose of the invention of rendering aqueous herbicidal solutions non-misting are water-dispersible synthetic polymers having a linear hydrocarbon structure and containing in a side chain, a hydrophilic group from the class consisting of carboxylic acid, carboxylic acid anhydride, carboxylic acid amide, hydroxy, pyridine, pyrrolidone, hydroxy alkyl ether, alkoxy, carboxylic acid salt groups, and mixtures of said groups.

Broadly speaking, the polymer treating agents which are effective for reducing drift of aqueous herbicide solutions fall into three classes; namely, (1) those consisting of polymeric organic substances which in an aqueous medium will form organic anions having a substantial number of negative electrical charges distributed at a plurality of positions on the polymer; (2) those consisting of polymeric organic substances which in an aqueous medium will form organic cations having a substantial number of postive charges distributed at a plurality of positions on the polymer; and (3) those consisting of polymeric organic substances which in an aqueous medium will not form ions but nevertheless contain a sufficient number of hydrophilic groups to be water-dispersible. The first class of materials is referred to herein as anionic organic polymers, the second class is referred to herein as cationic organic polymers, and the third class is referred to herein as non-ionic organic polymers. The first two classes can also be referred to as polyelectrolytes.

The term "polyelectrolyte" is intended to cover synthetic organic polymers which in an aqueous medium will form organic ions having a substantial number of electrical charges distributed at a plurality of positions.

The synthetic organic polymers containing only carboxylic acid, carboxylic acid anhydride, and carboxylic acid salt groups in a side chain are anionic. The synthetic organic polymers containing only pyridine or other similar nitrogen-containing nuclei are cationic. The synthetic organic polymers containing only a carboxylic acid amide, pyrrolidone, a hydroxy, a hydroxy alkyl ether and/or an alkoxy group in a side chain or non-ionic. The invention contemplates the employment of polymers which contain anionic, cationic and/or non-ionic groups. It also contemplates the employment of mixtures of anionic, cationic and/or non-ionic water-dispersible synthetic organic polymers.

The following synthetic organic polymers and their characteristic groupings illustrate the types of polymers which have been found to be effective for the practice of the invention:

TABLE II

| Number | Name | Characteristic Grouping |
|---|---|---|
| 1 | Polyacrylate sodium salt | $-CH_2-CH-$<br>$\qquad\;\;\, |$<br>$\qquad\;\;\, COO^{(-)}$<br>$\qquad\;\;\, Na^{(+)}$ |
| 2 | Polymethacrylic acid sodium salt | $\qquad\;\;\, CH_3$<br>$\qquad\;\;\, |$<br>$-CH_2-C-$<br>$\qquad\;\;\, |$<br>$\qquad\;\;\, COO^{(-)}$<br>$\qquad\;\;\, Na^{(+)}$ |
| 3 | Maleic anhydride-vinyl acetate copolymer | $-CH-CH_2-CH-\!-\!-CH-$<br>$\;\;\, |\qquad\qquad\;\, |\qquad\;\;\, |$<br>$\;\;\, O\qquad\qquad\;\, C\quad\;\; C=O$<br>$CH_3C=O\;\;\;\; O^{\diagdown}\!O^{\diagup}$ |
| 4 | Polyvinyl methyl ethermaleic anhydride | $-CH-CH_2-CH-\!-\!-CH-$<br>$\;\;\, |\qquad\qquad\;\, |\qquad\;\;\, |$<br>$\;\;\, O\qquad\qquad\;\, C\quad\;\; C=O$<br>$OCH_3\qquad O^{\diagdown}\!O^{\diagup}$ |

TABLE II—Continued

| Number | Name | Characteristic Grouping |
|---|---|---|
| 5 | Methacrylic acid-acrylamide copolymer | $-CH_2-\underset{\underset{COO^{(-)}}{\|}}{\overset{\overset{CH_3}{\|}}{C}}-CH_2-\underset{\underset{CONH_2}{\|}}{\overset{\overset{CH_3}{\|}}{C}}-$ <br> $H^{(+)}$ |
| 6 | Polyacrylic acid | $-CH_2-\underset{\underset{COO^{(-)}}{\|}}{CH}-$ <br> $H^{(+)}$ |
| 7 | Isopropenyl acetate-maleic anhydride sodium salt copolymer | $CH_3-\underset{\underset{CH_3C=O}{\|}}{\overset{\overset{CH_3}{\|}}{\underset{\|}{C}}}-CH-CH-$ <br> $\phantom{CH_3-C-}\underset{O^{(-)}}{C=O}\ \underset{O^{(-)}}{C=O}$ <br> $\phantom{CH_3-C-CH_3C=O\ \ }Na^{(+)}\ \ Na^{(+)}$ |
| 8 | Itaconic acid-vinyl acetate copolymer | $\underset{\underset{H^{(+)}}{\|}}{\overset{\overset{COO^{(-)}}{\|}}{\underset{\|}{C}}}-CH_2-CH_2-CH-$ <br> $\underset{CH_2COO^{(-)}}{\phantom{C}}\phantom{CH_2}\underset{CH_3C=O}{O}$ |
| 9 | Polyvinyl pyridine-hydrochloride | $-CH_2-CH-$ <br> pyridine ring with $NH^{(+)}Cl^{(-)}$ |
| 10 | α-methyl styrene-maleic anhydride sodium salt copolymer | $-\underset{\underset{\text{phenyl}}{\|}}{\overset{\overset{CH_3}{\|}}{C}}-CH_2-CH\underset{COO^{(-)}}{\ }-CH\underset{COO^{(-)}}{\ }-$ <br> $\phantom{-C-CH_2-CH-COO-}Na^{(+)}\ \ Na^{(+)}$ |
| 11 | Polyvinyl pyrrolidone | pyrrolidone ring structure $-\overset{H}{\underset{\|}{C}}-CH_2-$ with N, $H_2C$, $H_2C$, $CH_2$, $C=O$ |
| 12 | Styrene-maleic anhydride sodium salt copolymer | $-CH-CH_2-CH\underset{COO^{(-)}}{\ }-CH\underset{COO^{(-)}}{\ }-$ <br> phenyl; $Na^{(+)}\ \ Na^{(+)}$ |
| 13 | Polyvinyl alcohol | $-CH-CH_2-$ <br> $\ \|$ <br> $\ OH$ |
| 14 | Polyvinyl methyl ether | $-CH-CH_2-$ <br> $\ \|$ <br> $\ OCH_3$ |
| 15 | Methylmethacrylate-maleic anhydride sodium salt copolymer | $-\underset{\underset{COOCH_3}{\|}}{\overset{\overset{CH_3}{\|}}{C}}-CH_2-CH\underset{COO^{(-)}}{\ }-CH\underset{COO^{(-)}}{\ }-$ <br> $\phantom{-C-CH_2-CH-COO-}Na^{(+)}\ \ Na^{(+)}$ |
| 16 | Polyvinyl acetate emulsion | $-CH-CH_2-$ <br> $\ \|$ <br> $\ O$ <br> $\ \|$ <br> $CH_3C=O$ |
| 17 | Acrylic acid-styrene copolymer | $-CH-CH_2-CH-CH-$ <br> $\underset{H^{(+)}}{\overset{COO^{(-)}}{\|}}\phantom{-CH-}$ phenyl |

Any of the polyelectrolytes disclosed in United States Patent No. 2,625,529 can be employed for the purpose of the invention. When the copolymers are identified in terms of their monomeric constituents, it should be understood that the names applied to these copolymers refer to the molecular structure and are not limited to the polymers prepared by the copolymerization of specific monomers. In many cases, the identical copolymers can be prepared from other monomers and converted by subsequent chemical reaction to the desired copolymer.

Where the copolymer is derived from a polycarboxylic acid derivative and at least one other monomer copolymerizable therewith, the polycarboxylic acid derivative may be maleic anhydride, maleic acid, fumaric acid, itaconic acid, aconitic acid, citraconic acid, the amides of these acids, the alkali metal (e.g. sodium, potassium and lithium), the alkaline earth metal (e.g. magnesium, calcium, barium and strontium), and ammonium salts of these acids, the partial alkyl esters (e.g. methyl, ethyl, propyl, butyl, mono esters), the salts of said partial alkyl esters, and the substituted amides of these polycarboxylic acids. Where the hydrophilic maleic acid derivatives are used as one of the starting components to form the copolymer, the hydrophobic comonomers may be, for example, styrene, alphamethylstyrene, vinyl toluene, chlorostyrene, vinyl acetate, vinyl chloride, vinyl formate, vinyl alkyl ethers, alkyl acrylates, alkyl methacrylates, ethylene, propylene, and/or isobutylene.

The foregoing synthetic copolymers are preferably obtained by reacting equimolar proportions of a polycarboxylic acid derivative and at least one other monomer. However, certain of the hydrophilic derivatives of unsaturated polycarboxylic acids can be polymerized in less than equimolar proportions with some of the less hydrophobic comonomers, for example, vinyl formate and vinyl acetate.

In addition to homopolymers and copolymers of any of the just mentioned monomers, combinations thereof or others, terpolymeric substances may likewise be usually employed in reducing mist of sprayed herbicidal liquid concentrates. A greatly preferred group includes polymerized acrylamide as one of the components of either a copolymer or terpolymer. Usually the copolymer or terpolymer contains acrylamide as a major ingredient. Greatly preferred polymers include acrylamide-acrylic acid copolymers, and acrylamide-maleic acid-methacrylic terpolymers.

In addition to the above described results with cationic and anionic organic materials, highly desirable results have been obtained when high molecular weight ethylene oxide polymers are used. These polymers have a viscosity in centipoises at 25° C., of from 500 to 30,000 when made up in one-half to five percent aqueous solutions. For best results, such polymers should have molecular weights in excess of one million. The lower molecular weight materials have molecular weights starting about 200,000. These polymers are prepared by heating appropriate quantities of ethylene oxide with initiating molecules such as ethanol, ethylene glycol and the like in a sealed tube for six hours or more in the presence of a catalyst. Suitable catalysts include alkaline earth metal carbonates such as strontium or calcium carbonate. While ethylene oxide condensate polymers are the most preferred materials, other non-ionic, polypolar polymers are not precluded from use in the invention. The expression "polypolar polymers" refers to polymers having a plurality of non-ionized groups whereby said polymers are rendered hydrophilic. Such compounds for use with this invention desirably include polyacrylamide, poly-substituted acrylamides, polyvinyl alcohols, polyvinyl pyrrolidones and polyvinyl oxazolidones, as mentioned above.

Organic polymeric coagulants of vegetable and cellulosic origin may also be used in the newly invented process covered in this application. These include water-soluble or dispersible starches, starch derivatives, dextrans, phosphated starches, Gum Ghatti, Jaguar, Locust Bean Gum, carboxy methyl cellulose, and other well-known high-molecular weight water-soluble vegetable gums and their derivatives.

When liquid oil concentrates of herbicides or water-in-oil emulsions are to be treated, it is greatly preferred that the polymeric anti-fogging agent be soluble in the oil component. It is therefore preferable that the polymer be derived from a hydrophobic monomer. Examples typical of these are styrene, alpha-methylstyrene, vinyl toluene, chlorostyrene, vinyl acetate, vinyl chloride, vinyl formate, vinyl alkyl ethers, alkyl acrylates, alkyl methacrylates, ethylene, propylene, n-butylene, isobutylene, etc. The most preferred oil-soluble polymers have a molecular weight in excess of 100,000 and most preferably at least 300,000. Those polymers which have shown the greatest measure of success have a linear hydrocarbon structure derived from an ethylenically unsaturated monomer containing 2–5 carbon atoms. These monomers may contain one or two unsaturated groups. Among these, polyethylene, polypropylene, polyisobutylene, polybutadiene, polyisoprene and copolymers thereof have shown the most promise. Polyisobutylene and polyisoprene (natural rubber) are the most preferred of this group.

It has been discovered that the instant process is adaptable for a variety of spray operations other than spraying of herbicidal liquids. The following are illustrative of just a few spraying operations where incorporation of an anti-misting polymer prevents undesirable fogging or misting: in metal cleaning, washing and processing; in water-down operations on roadways and similar areas; in washing and cooling applications; in cooling with oil in a variety of industrial applications; for use in a variety of industrial washing machines; in steel mill applications; in said, coal, gravel, and dish washing; in asphalt spraying and other industrial applications of this type; in fresh stone and gravel washing; in degreasing; for use in spraying liquids into mixing tanks; in spraying eliminator plates; in cooling conveyor belts; in film washing; in spray cooling; in lubricant spraying; for use in air washers; for foam control; in humidifying; for use in desuperheating steam in pipes; for spraying inside ducts and pipes, in coke quenching; in cooling via heat exchangers; in pulp washing; for absorption stack spraying; in tank cleaning; in washing of mine and quarry products, fruits and vegetables; in spray drying a variety of products; for use in packing-house brine spray cooling systems; in brine spraying; in tubular unit coolers; for roof cooling; in wetting operations; in mist cooling; in evaporative cooling; for use in water display fountains; for spraying insecticides, liquid fertilizers and other pest control reagents; for use in fuel injection processes; for use in aerosol spray containers; in flash evaporating methods; in automatic car washing techniques; etc. In any of the just mentioned spraying operations or others of a similar nature, the liquid to be sprayed may be treated as exactly outlined with respect to spraying of herbicidal liquids. Equally good results of substantial reduction in misting and fogging may be obtained in these just mentioned processes.

By the term "soluble," as applied to the property of the polymers of the invention of being able to be incorporated into herbicide or other solutions, is meant the ability of being solubilized or dispersed in at least use amounts in the liquid being treated.

It is not totally understood how the just mentioned polymers or others falling within the defined group of workable materials aid in substantially reducing misting or fogging of sprayed solutions even when applied in relatively minute amounts. Without polymer present during a spraying operation a pressure drop occurs in which excess energy present actually fractures the liquids into mist or fog. When the polymer is added to the sprayed solution it is believed a visco-elastic effect takes place. That is to say, the polymer-treated liquid actually is deformed in a visco-elastic manner which allows the energy from the pressure drop to fracture the liquid in a more uniform manner, and prevent formation of very small droplets. This occurs rather than the spray breaking up into a mist pattern. In essence, shock or energy is taken up by a polymer-treated liquid in contradistinction to an untreated solution which is incapable of resisting the shock or energy without substantially changing its rheological characteristics.

It was noted that in spraying polymer treated herbicidal solutions and other treated solutions, a variety of advantages other than mist reduction are present. For example, uniformity of spray pattern as well as droplet size is achieved. In addition, concentration of spray pressure at point of impact is increased. Such effect may be particularly useful in cleaning, desealing, etc., operations.

In order to determine the efficacy of the invention, certain spray tests were devised. In the first series of tests, water was sprayed as the base fluid at a spray nozzle pressure of 50 p.s.i., without additive and with various polymers at varying dosage levels. Table III below shows the results of these tests.

TABLE III

| Additive | Additive Level, p.p.m. | Results |
|---|---|---|
| None | | Very heavy mist. |
| Terpolymer of acrylamide-maleic anhydride-methacrylic acid. | 200 | Do. |
| Do | 400 | Almost no mist. |
| Do | 800 | No mist. |
| Polyoxyethylene | 200 | Do. |
| Do | 100 | Do. |
| Do | 50 | Very little mist. |
| Polyacrylamide | 200 | Do. |
| Do | 400 | Almost no mist. |
| Do | 800 | No mist. |
| Ammonium polyacrylate | 200 | Little mist. |

In all of the above tests, the polymer antimisting agent had a molecular weight in excess of 100,000, and in most instances had molecular weights of a much higher magnitude. For example, the polyoxyethylene treating agent had a molecular weight estimated to be approximately 7 million. Likewise, the acrylamide homopolymer and acrylamide-based terpolymer materials had molecular weights of approximately 5–10 million.

In another series of tests a high aromatic content oil which is generally used as a phytotoxic carrier for other herbicides was also sprayed. Considerable drift was noted without benefit of polymer additive treatment. When a high molecular weight polyisobutylene was added to the oil in a dosage amount of 400 p.p.m., a considerable reduction of misting of the oil system was noted.

In further experimentation, various runs were initiated to determine if the through-put of a nozzle was affected by addition of polymer. Specifically, the terpolymer of acrylamide-methacrylic acid-maleic anhydride was added to water at various additive levels and compared to the through-put for a non-treated water sample. A blank of 75 ml. of water had a through-put time of 4.5 seconds at 40 p.s.i. At the 200 p.p.m. additive level of polymer, the through-put of the 75 ml, of polymer treated water was 4.4 seconds; at 400 p.p.m. the through-put was 4.3 seconds, and at 800 p.p.m. the through-put time for 75 ml. of treated water was 4.0 seconds. Thus, it is seen that not only was the through-put unaffected, but actually the efficiency of the spraying operating increased due to increase in through-put per unit time of polymer-treated water solutions.

The following examples further illustrate the utility of the invention. Specifically, in the following tests, herbicidal solutions of both oil and water types were sprayed in the presence of various polymeric substances. In each case, a definite decrease of misting or fogging was noted when compared to like spraying involving no polymer.

EXAMPLE I

A 1% solution of sodium trichloroacetate herbicide was applied to oats and millite via sprayings with and without a polymer. In the series of runs in which polymer was present, 200, 400 and 800 p.p.m. of an acrylamide-maleic anhydridemethacrylic acid terpolymer was added to three portions of the herbicidal aqueous liquid. The following observations were made. It was noted that a definite increase in retention of the spray liquid was present in all three liquids containing anti-misting polymer. The retained spray was in the form of fairly large droplets. After approximately one week's time, it was noted that the herbicidal activities of all trial spray runs with and without added polymer were essentially the same.

EXAMPLE II

In this example an approximate 1% oil-in-water emulsion of pentachlorophenol solution was sprayed alone and in presence of the above described terpolymer. The polymer treated spray solution had a substantially reduced mist pattern in all cases.

EXAMPLE III

A herbicidal oil solution was made up containing the following described components. The oil was itself phytotoxic in nature and contained approximately 45% aromatics. Into this oil was dissolved 1.9% of the propylene glycol butyl ether ester of 2,4,5-trichlorophenoxy acetic acid. This particular herbicidal oil solution was tested in a field application, and specifically sprayed upon dormant brush growing along a roadside. Without benefit of polymer treatment, it was noted that the spray blew in a wide pattern, and even across the entire road width. With an incorporation of approximately 400 p.p.m. of a polyisobutylene polymer having a molecular weight of approximately 350,000, a thus treated oil solution containing the above herbicide components was sprayed in a comparative application. In this instance a definite reduction in drift was noted and at no time did the spray blow any appreciable distance.

EXAMPLE IV 20 lbs. of 2,2-dichloropropionic acid was dissolved in 100 gallons of water. This substance was sprayed along a railroad right-of-way in a southern area of the United States. Specifically, Johnson grass was the undesirable vegetation being treated, and noticeable misting occurred in the spray operation. When 200 p.p.m. of the terpolymer of Example I was mixed into the liquid herbicide solution, misting or fogging of the thus benefitted herbicidal solution was almost completely obviated. The same phenomenon of polymer benefit was noted in spraying 60 lbs. of sodium trichloroacetate dissolved in 100 gallons of water and 100 lbs. of sodium chlorate dissolved in 100 gallons of water.

EXAMPLE V

Approximately a 1% oil-in-water emulsion of pentachlorophenol was made up. To this was added both 3 (p-chlorophenyl)-1, 1 dimethyl urea and 2-chloro,4-ethylamino, 6-isopropylamino s-triazine. The two above materials were suspended in the oil and water emulsion, and the entire solution mixture sprayed with and without benefit of the terpolymer described in Example I.

It was noted that considerable drift occurred without polymer application, while inclusion of approximately 100 p.p.m. of terpolymer substantially reduced spray drift.

EXAMPLE VI

Into the oil described in Example III was dissolved 3.4% of the isooctyl ester of 2(2,4,5-trichlorophenoxy) propionic acid herbicide. This oil solution was again sprayed with and without benefit of polyisobutylene (molecular weight=300,000; 400 p.p.m. treatment level). The same results were noted as set out in Example III.

The above examples are intended to illustrate the process of the invention, and are not intended to be limitative thereof. Other modifications and variations of the invention will be apparent to those skilled in the art.

The invention is hereby claimed as follows:

1. A method of controlling the growth of undesirable vegetation which comprises the steps of spraying aqueous solutions which contain:
   (a) a phytotoxic amount of a herbicide, and
   (b) dissolved therein at least 10 parts per million, but yet a substantially non-viscosity increasing amount of a water soluble polymer formed by the polymerization of at least one monoolefinic compound through an aliphatic unsaturated group and have a molecular weight of at least 100,000, said liquid being characterized as having reduced misting tendencies when sprayed.

2. The method of claim 1 where the water soluble polymer has a linear hydrocarbon structure which contains in a side chain a hydrophilic group selected from the class consisting of carboxylic acids, carboxylic anhydride, carboxylic acid amide, hydroxy, pyridine, pyrrolidone, hydroxy alkyl ether, alkoxy, carboxylic acid salt, and mixtures of said groups.

3. The method of claim 2 where the water soluble polymer has a molecular weight of at least 300,000.

References Cited

UNITED STATES PATENTS

| | | |
|---|---|---|
| 2,652,322 | 9/1953 | Hedrick et al. _____ 71—2.7 |
| 3,045,394 | 7/1962 | Coulter _____ 71—2.1 X |
| 3,067,089 | 12/1962 | Winslow _____ 167—42 |
| 3,158,535 | 11/1964 | Beerbower et al. _____ 167—42 |
| 3,131,119 | 4/1964 | Fordyce et al. |
| 3,175,898 | 3/1965 | Seymour et al. _____ 71—27 |
| 3,235,366 | 2/1966 | Seymour et al. _____ 71—2.6 |

FOREIGN PATENTS

| | | |
|---|---|---|
| 831,344 | 3/1960 | Great Britain. |

JAMES O. THOMAS, JR., *Primary Examiner.*

A. J. ADAMCIK, *Assistant Examiner.*

UNITED STATES PATENT OFFICE
CERTIFICATE OF CORRECTION

Patent No. 3,360,356                          December 26, 1967

Joseph F. Vartiak

It is certified that error appears in the above identified patent and that said Letters Patent are hereby corrected as shown below:

Column 11, TABLE III, third column, line 2 thereof, "Do." should read -- Very little mist. --.

Signed and sealed this 2nd day of December 1969.

(SEAL)
Attest:

Edward M. Fletcher, Jr.                   WILLIAM E. SCHUYLER, JR.
Attesting Officer                              Commissioner of Patents